United States Patent
Milne et al.

(10) Patent No.: US 12,393,179 B2
(45) Date of Patent: Aug. 19, 2025

(54) OFFLINE TROUBLESHOOTING AND DEVELOPMENT FOR AUTOMATED VISUAL INSPECTION STATIONS

(71) Applicant: AMGEN INC., Thousand Oaks, CA (US)

(72) Inventors: Graham F. Milne, Ventura, CA (US); Thomas C. Pearson, Newbury Park, CA (US); Joseph Peter Bernacki, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 606 days.

(21) Appl. No.: 17/777,083

(22) PCT Filed: Nov. 10, 2020

(86) PCT No.: PCT/US2020/059776
§ 371 (c)(1),
(2) Date: May 16, 2022

(87) PCT Pub. No.: WO2021/096827
PCT Pub. Date: May 20, 2021

(65) Prior Publication Data
US 2022/0413476 A1    Dec. 29, 2022

Related U.S. Application Data

(60) Provisional application No. 62/936,143, filed on Nov. 15, 2019.

(51) Int. Cl.
*G05B 19/418*    (2006.01)
*G06T 7/00*    (2017.01)

(52) U.S. Cl.
CPC ........ *G05B 19/41875* (2013.01); *G06T 7/001* (2013.01); *G05B 2219/37009* (2013.01); *G06T 2207/30108* (2013.01)

(58) Field of Classification Search
CPC .... G05B 19/41875; G05B 2219/37009; G06T 7/001; G06T 2207/30108; G01N 21/8803
(Continued)

(56) References Cited

U.S. PATENT DOCUMENTS 7,499,930 B2    3/2009    Naka et al.
8,368,570 B2    2/2013    Rysinski et al.
(Continued)

FOREIGN PATENT DOCUMENTS

CN    1029726 C    9/1995
CN    1649404 A    8/2005
(Continued)

OTHER PUBLICATIONS

Chinese Patent Application No. 202080079642.9, Office Action, dated Sep. 28, 2024.
(Continued)

*Primary Examiner* — Neil R McLean
(74) *Attorney, Agent, or Firm* — MARSHALL, GERSTEIN & BORUN LLP

(57) ABSTRACT

In a method for replicating performance of an automated visual inspection (AVI) station, a mimic AVI station that performs one or more AVI functions of the AVI station is constructed. One or more container images are captured by an imaging system of the AVI station while a container is illuminated by an illumination system of the AVI station, and one or more additional container images are captured by a mimic imaging system of the mimic AVI station. The method also includes identifying, by one or more processors, one or more differences between the one or more additional container images and the one or more container images, generating, by the one or more processors, a visual indication of the difference(s) and/or one or more suggestions for (Continued)

modifying the mimic AVI station, and modifying the mimic AVI station based on the visual indication.

25 Claims, 10 Drawing Sheets

(58) Field of Classification Search
USPC .......................................................... 382/141
See application file for complete search history.

(56) References Cited

U.S. PATENT DOCUMENTS

| | | |
|---|---|---|
| 2003/0228066 A1 | 12/2003 | Tomita et al. |
| 2012/0002860 A1 | 1/2012 | Sakai et al. |
| 2013/0170731 A1* | 7/2013 | Hirota ................... G06T 7/0002 |
| | | 382/141 |
| 2018/0182067 A1 | 6/2018 | Liu et al. |
| 2020/0058161 A1* | 2/2020 | ReMine ................. G06T 17/00 |

FOREIGN PATENT DOCUMENTS

| | | |
|---|---|---|
| CN | 101690668 A | 4/2010 |
| CN | 102624389 A | 8/2012 |
| CN | 103223870 A | 7/2013 |
| CN | 104903677 A | 9/2015 |
| JP | S63187627 A | 8/1988 |
| JP | 2004069673 A | 3/2004 |
| JP | 2009181508 A | 8/2009 |
| WO | WO-2009018612 A1 | 2/2009 |
| WO | WO-2014/099048 A2 | 6/2014 |
| WO | WO-2019/190647 A1 | 10/2019 |

OTHER PUBLICATIONS

Yao et al., Design of imaging simulation system for infrared image sensor, Chinese Journal of Liquid Crystals and Displays, 28(5):788-92 (2013).
Search Report and Written Opinion in International Application No. PCT/US2020/059776 dated Feb. 23, 2021, 15 pages.
European Patent Application No. 20820609.4, Communication Pursuant to Article 93(3) EPC, dated Mar. 22, 2024.
Japanese Patent Application No. 2022-527125, Office Action, dated Oct. 15, 2024.
Eurasian Patent Application No. 202291033, Office Action, mailed Apr. 20, 2023.
Chinese Patent Application No. 202080079642.9, Office Action, dated Mar. 12, 2025.

* cited by examiner

OFFLINE TROUBLESHOOTING AND DEVELOPMENT FOR AUTOMATED VISUAL INSPECTION STATIONS

FIELD OF DISCLOSURE

The present application relates generally to automated visual inspection (AVI) systems for pharmaceutical or other products, and more specifically to techniques for performing offline troubleshooting and/or development for an AVI station.

BACKGROUND

In certain contexts, such as quality control procedures for manufactured drug products, it is necessary to examine samples (e.g., containers such as syringes or vials, and/or their contents such as fluid or lyophilized drug products) for defects. The acceptability of a particular sample, under the applicable quality standards, may depend on metrics such as the type and/or size of container defects (e.g., chips or cracks), or the type, number and/or size of undesired particles within a drug product (e.g., fibers), for example. If a sample has unacceptable metrics, it may be rejected and/or discarded.

To handle the quantities typically associated with commercial production of pharmaceuticals, the defect inspection task has increasingly become automated. Moreover, the specialized equipment used to assist in automated defect inspection has become very large, very complex, and very expensive, and requires substantial investments in manpower and other resources to qualify and commission each new product line. As just one example, the Bosch® 296S commercial line equipment, which is used for the fill-finish inspection stage of drug-filled syringes, includes 15 separate visual inspection stations with a total of 23 cameras (i.e., one or two cameras per station). As a whole, this equipment is designed to detect a broad range of defects, including container integrity defects such as large cracks or container closures, cosmetic container defects such as scratches or stains on the container surface, and defects associated with the drug product itself such as liquid color or the presence of foreign particles.

Because it can be cost-prohibitive to purchase additional pieces of AVI line equipment, troubleshooting and characterization activities for new products typically must be done in situ. Thus, troubleshooting and new product characterization typically require lengthy downtimes, resulting in suboptimal long-term production rates.

SUMMARY

Embodiments described herein relate to systems and methods in which a "mimic" AVI station is constructed or upgraded in an effort to replicate the performance of an existing AVI station, thereby allowing offline troubleshooting or new product characterization and/or qualification efforts that do not interfere, or interfere to a lesser degree, with production line operation. In some embodiments, the mimic AVI station is a dedicated offline (e.g., lab-based) station that mimics one or more AVI functions of a station in existing commercial line equipment (e.g., one of multiple stations in the line equipment). In such an embodiment, the mimic AVI station may be used to troubleshoot a problem with a particular, corresponding station in the commercial line equipment, or otherwise improve the performance of the corresponding station, without necessitating a lengthy shutdown of the line equipment. For example, offline modifications may be made to hardware components (e.g., lighting devices, starwheels, etc.), hardware arrangements (e.g., the distance or angle between a sample and a camera or lighting device, the configuration of a lighting device, etc.), and/or software (e.g., code that implements an inspection algorithm). Once the appropriate modifications are identified, the commercial line equipment may be shut down for a relatively brief time in order to implement those changes for the original AVI station, possibly followed by some amount of in situ qualification work. Because the mimic AVI station is offline, it offers the opportunity to conduct root cause investigations, recipe development and/or other support activities in the lab rather than on the commercial line equipment.

In other embodiments, the mimic AVI station is instead a station of the commercial line equipment, and the goal is to mimic the characteristics/performance of a lab-based AVI station. In such an embodiment, the lab-based AVI station may be used to characterize and qualify inspection for new drug products, which would otherwise/traditionally require extensive downtime of the line equipment and prevent its concurrent use for other drug products. Once the appropriate hardware components/configuration and the appropriate software are identified, the line equipment may be shut down for a relatively brief time in order to implement those changes (again, possibly by followed by some amount of in situ qualification work). Similar to the previous embodiment, this embodiment offers the opportunity to conduct recipe development, root cause investigations and/or other support activities in the lab rather than on the commercial line equipment.

In either of these embodiments, the construction of a suitably similar mimic AVI station presents a significant challenge. In particular, it is important that the imager(s) (e.g., camera(s), imaging optics), illumination (e.g., lighting device(s), environmental/ambient lighting or reflections), relative geometry (i.e., spatial arrangement), image processing software, computer hardware, and/or mechanical movement of the product, all of which can affect inspection performance, closely match the AVI station being reproduced. This is particularly challenging because many of these components/characteristics tend to be unique to any given AVI station. Thus, in embodiments of this disclosure, a robust and reliable process is used to replicate, as closely as possible (or as closely as desired), an AVI station.

Initially, any of various suitable techniques may be used to identify the components/construction of the AVI station. For example, detailed, manual photographs, 3D scans, and measurements may be taken. Alternatively, or in addition, three-dimensional computer-aided design (CAD) files (e.g., exploded technical drawings in a vector graphics pdf or other format) may be used for this purpose. With this information, the hardware of the mimic AVI station can be obtained and/or assembled, and placed in the same relative arrangement/geometry as the original AVI station (i.e., the station being mimicked). 3D scanners or other equipment/techniques may also be used to re-create the AVI station.

Various techniques disclosed herein can be used to improve and validate a constructed or partially constructed mimic AVI station, by comparing sample (e.g., container) images captured by the mimic AVI station with sample images captured by the AVI station being reproduced. The feedback obtained from this process can enable a user (e.g., engineer) to not only determine whether the mimic AVI station performs in a manner sufficiently like the original AVI station, but also determine which aspects of the mimic AVI station should be modified in order to better replicate the performance of the original AVI station.

In some embodiments, an image comparison software tool performs the comparisons, and generates corresponding outputs, for this purpose. For example, the image comparison tool may compute and report salient image metrics (e.g., metrics indicative of light intensity, camera noise, camera/sample alignment, defocus, motion blurring, etc.) to a user in real time, providing the user with a reliable process to fine tune and assess the viability of the mimic AVI station in a relatively quick manner. In some embodiments, the image comparison tool generates specific suggestions based on the metrics (e.g., "decrease distance between camera and container"), which are displayed to the user. Advantageously, the image comparison tool may enable the accurate reproduction of AVI station performance even when the original and mimic AVI stations are remotely located. That is, it may be possible to adequately reproduce AVI station performance even in certain situations where it is difficult or impossible to precisely reproduce hardware geometries, computer hardware, and/or other aspects of an AVI station. The image comparison tool generally provides a scientific, repeatable process that lessens the risks associated with human error and subjectivity, and is therefore more likely to satisfy regulatory authorities as to the true equivalence between an AVI station and a corresponding mimic station.

BRIEF DESCRIPTION OF THE DRAWINGS

The skilled artisan will understand that the figures described herein are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1A:
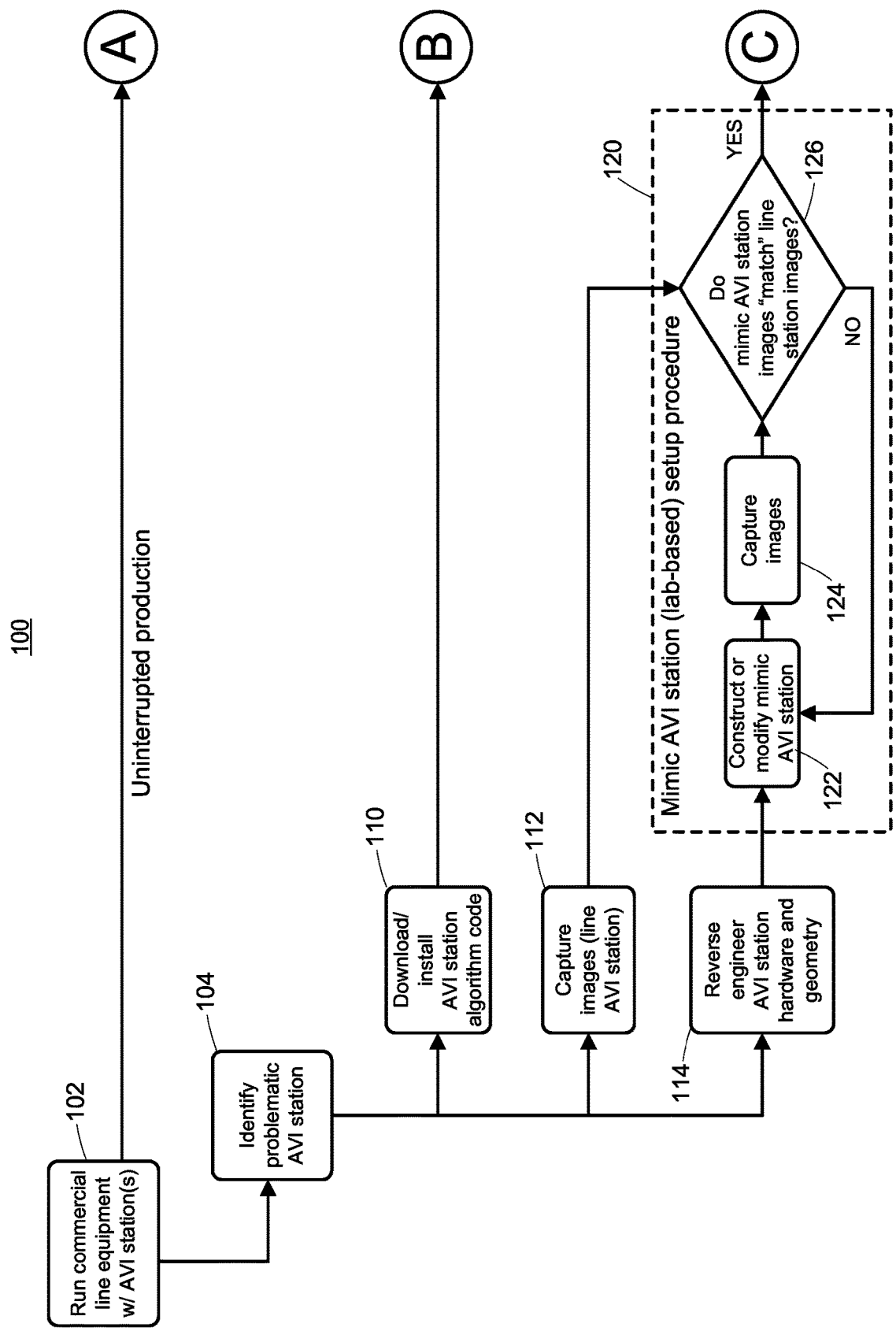
FIGS. 1A and 1B depict an example process for troubleshooting an AVI station of commercial line equipment by constructing and using a mimic AVI station.
Figure 1B:
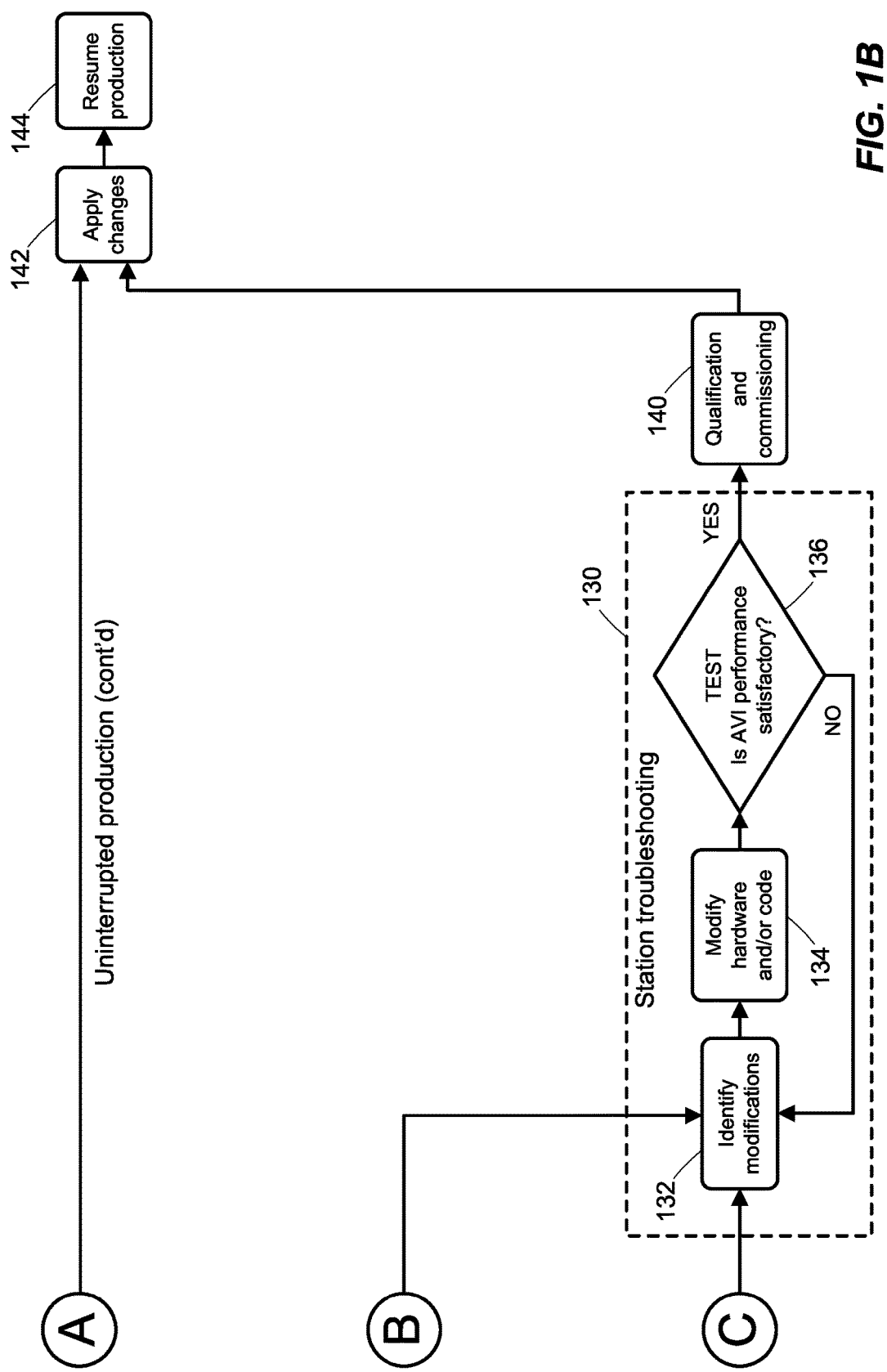

FIGS. 1A and 1B depict an example process 100 for troubleshooting an automated visual inspection (AVI) station of commercial line equipment by constructing and using a mimic AVI station. Referring first to FIG. 1A, at stage 102, commercial line equipment that includes one or more AVI stations runs in a normal/production operation mode. The commercial line equipment may be used at a "fill-finish" stage for quality control in the production of pharmaceutical products (e.g., syringes containing liquid drug products or glass vials containing lyophilized drug products), for example. The AVI station(s) may include one or more stations dedicated to container inspection (e.g., syringe, vial, etc.), and/or one or more stations dedicated to sample inspection (e.g., detecting and/or characterizing particles in a drug product within the container). The commercial line equipment may be the commercial line equipment 302, which will be discussed in greater detail below with respect to FIG. 3, for example. The top horizontal line/arrow in FIGS. 1A and 1B, extending from stage 102 to stage 142 (discussed below), represents uninterrupted product line inspection using the commercial line equipment. The horizontal axis of FIGS. 1A and 1B generally represents time, but is not necessarily to scale, and FIGS. 1A and 1B do not necessarily (but may) represent the order of operations (e.g., stage 110 may occur before or after a first iteration of stage 122, and so on).

At stage 104, a problematic AVI station within the commercial line equipment is identified. For example, an individual monitoring the production process may observe that a particular AVI station of the line equipment is identifying a large number of false positives (e.g., samples that are marked as defective by the line equipment, but on closer manual or automated examination are determined to be acceptable), and/or is failing to identify defective samples.

At stage 110, an operator downloads and/or installs software code used for the problematic AVI station to a computing system associated with a lab-based setup (i.e., what will be a mimic AVI station). The code may be transferred directly from the line equipment, or may be installed in another manner (e.g., from a portable memory device, or an Internet download, etc.). In some embodiments, the installed code includes the code responsible for container movement, image capture, and image processing. For example, the code may control a mechanism that agitates (e.g., rotates, shakes, inverts, etc.) a container before and/or during imaging, trigger one or more cameras at the appropriate times, and process the camera images to detect defects of the containers (e.g., cracks, chips) and/or contents (e.g., large fibers or other foreign substances).

At stage 112, the problematic AVI station within the line equipment captures one or more images of a container. Depending on the embodiment and/or scenario, stage 112 may or may not require any interruption to the normal/production operation of the line equipment. For example, the captured images may be images that are also used during production.

At stage 114, hardware of the problematic AVI station is reverse engineered to initiate a mimic AVI station setup procedure 120. Stage 114 may include reverse engineering of the hardware components of the problematic AVI station (e.g., cameras, optical components, lighting devices, mechanisms for moving containers, etc.), the hardware component assembly of the problematic AVI station (e.g., how various components and sub-components are assembled), the relative geometry/arrangement of hardware components in the problematic AVI station (e.g., orientations and distances of a container relative to lighting device(s) and camera(s)), and/or other characteristics of the problematic AVI station (e.g., container rotation speed, etc.). In some embodiments, the reverse engineering is purely manual, and involves precise (e.g., caliper, ruler, etc.) measurements, review of available schematics, and so on. 3D scanners may also be used to accurately capture dimensions of the AVI station. In other embodiments, at least a portion of the reverse engineering is automated, e.g., by processing files or images indicating dimensions (angles, distances, etc.) of the problematic AVI station.

At a first iteration of stage 122, the mimic AVI station is constructed using the knowledge gained at stage 114. The construction may be partially or entirely manual. Any suitable fabrication techniques may be used, such as CNC machining of metals and plastics, and/or 3D printing, to construct certain non-electronic hardware components (e.g., starwheels, etc.) of the mimic AVI station. The first iteration of stage 122 may also include purchasing, or otherwise obtaining, various off-the-shelf components, such as cameras, LED rings or other lighting devices, and so on. The first iteration of stage 122 may also involve setting various software parameters to match parameter settings that were used at stage 112. For example, a user may set a container rotation speed to be equal to a rotation speed setting that was used by the line equipment when capturing the image(s) at stage 112.

At a first iteration of stage 124, after an initial attempt (at stage 122) to replicate the problematic AVI station, one or more images of a container are captured by one or more imagers (e.g., cameras) of the mimic AVI station. The container should be of the same type as the container that was imaged at stage 112, and may in fact be the same container.

At a first iteration of stage 126, an image comparison tool determines whether the container image(s) captured at stage 112 match, to some acceptable degree, the container image(s) captured at the first iteration of stage 124. To make this determination, the image comparison tool may generate a number of metrics for each of the images or image sets, and compare those metrics to determine a measure of similarity (e.g., a similarity score). For example, the image comparison tool may generate metrics relating to size (e.g., how large the container appears within the image), orientation (e.g., an angle of a container wall relative to a vertical axis of an image), light intensity (e.g., as indicated by image pixel intensities), defocus, motion blurring, and/or other characteristics. The image comparison tool may also compare the corresponding metrics of the image(s) from stage 112 and the image(s) from stage 124 (e.g., by computing difference values). Example metrics are discussed in further detail below with reference to FIGS. 6 and 7. The determination at stage 126 may be made by a user observing outputs of the image comparison tool, or by the tool itself, depending on the embodiment.

If the image comparison tool (or a user of the tool) determines at the first iteration of stage 126 that the images or image sets are not sufficiently similar, the mimic AVI station is modified at a second iteration of stage 122. The modifications at the second iteration of stage 122 are made in a focused manner, based on output of the image comparison tool at the first iteration of stage 126. For example, if the image comparison tool indicates that a light intensity of the image(s) captured by the mimic AVI station at the first iteration of stage 124 is too low, the user may move a lighting device closer to the container during the second iteration of stage 122, or change a lens aperture size, etc. As another example, if the image comparison tool indicated that an image captured at the first iteration of stage 124 is less focused than an image captured at stage 112, the user may move the container closer to or further from a camera of the mimic AVI station. In some embodiments, the image comparison tool processes the metrics of the compared images to provide a suggestion at stage 126, such as "move lighting device closer to container," "move Lighting Device B closer to container," or "move Lighting Device B closer to container by 3 mm," etc.

After the developer makes the modification(s) at the second iteration of stage 122, the mimic AVI station captures a new set of one or more images at a second iteration of stage 124 (e.g., in response to a manual trigger from the user), and the image comparison tool compares the new image(s) to the images captured at stage 112 (or possibly to new images captured by the problematic AVI station) at a second iteration of stage 126. The loop within procedure 120, as seen in FIG. 1A, may continue for any number of iterations until the image comparison tool (or a user observing the outputs thereof) determines at an iteration of stage 126 that the mimic AVI station has reproduced the performance/characteristics of the problematic AVI station with sufficient accuracy, as indicated by a sufficient degree of similarity between the image(s) captured by the mimic AVI station and the image(s) captured by the problematic AVI station of the line equipment. In some scenarios, a sufficient degree of similarity may be achieved even with substantial differences in hardware components and/or geometries. In other scenarios, a sufficient degree of similarity requires a precise replication of hardware components and geometries.

When a sufficient degree of similarity is achieved, the mimic AVI station is ready for use in a troubleshooting capacity, during a process 130 (as seen in FIG. 1B). In the example process 130, at a first iteration of a stage 132, the user (e.g., an engineer) considers/theorizes appropriate modifications to the inspection algorithm/recipe, and/or modifications to the hardware setup (e.g., different cameras, lenses, lighting device types, etc., and/or a different arrangement and/or settings of such devices/components) in an attempt to correct the problem that was observed at stage 104. Thereafter, at a first iteration of stage 134, the operator modifies the hardware and/or code in accordance with the modifications identified at the first iteration of stage 132.

At a first iteration of stage 136, the mimic AVI station is used to test whether its performance is satisfactory, i.e., whether the problem observed at stage 104 has been corrected to a sufficient degree. Stage 136 may involve comparing statistical results (e.g., false positive rates, etc.) to a standards-based requirement, for example. Each iteration of stage 136 may be time and/or labor intensive, as it may require a large number of images, and/or a large variety of container/product samples, to determine whether the problem has been solved (e.g., if the observed problem was a low, but still unacceptable, rate of false positives or negatives). However, the time investment may be acceptable because it does not require interruption of the commercial line equipment.

If performance is not determined to be satisfactory/acceptable at stage 136, the process 130 is repeated, with new modifications being identified/theorized at a second iteration of stage 132. The process 130 may be repeated for any number of iterations, without interrupting operation of the line equipment, until performance is determined to be satisfactory/acceptable at an iteration of stage 136. At that point, the troubleshooting process 130 is complete and, if qualification and commissioning activities are successfully performed (at stage 140), the modifications made during the process 130 (i.e., as reflected in the final state of the mimic AVI system after the final iteration of stage 134) are applied to the problematic AVI station, at stage 142. While stage 142 generally requires the stopping of production with the commercial line equipment, in order to make the changes from the process 130 (and possibly also for some abbreviated qualification/commissioning operations), the downtime is significantly shorter than what would be the case if the troubleshooting process 130 instead had to be done in situ on the problematic AVI station itself. After the changes are applied to the problematic AVI station at stage 142, production (i.e., normal/production operation of the line equipment) resumes at stage 144.

While the process 100 has been described with reference to troubleshooting of a problematic AVI station, it is understood that the process 100 may instead be used to improve (e.g., further optimize inspection performance of, or make more cost-efficient, etc.) an AVI station that is already performing reasonably well. Moreover, while the process 100 has been described with reference to the fill-finish stage of a pharmaceutical production line, it is understood that the process 100 may instead be used at a different stage (e.g., when inspecting a product after device assembly, or when inspecting labeling and/or packaging of a product, etc.), and/or may instead be used in a non-pharmaceutical context (e.g., another context with relatively stringent quality standards).

Figure 2:
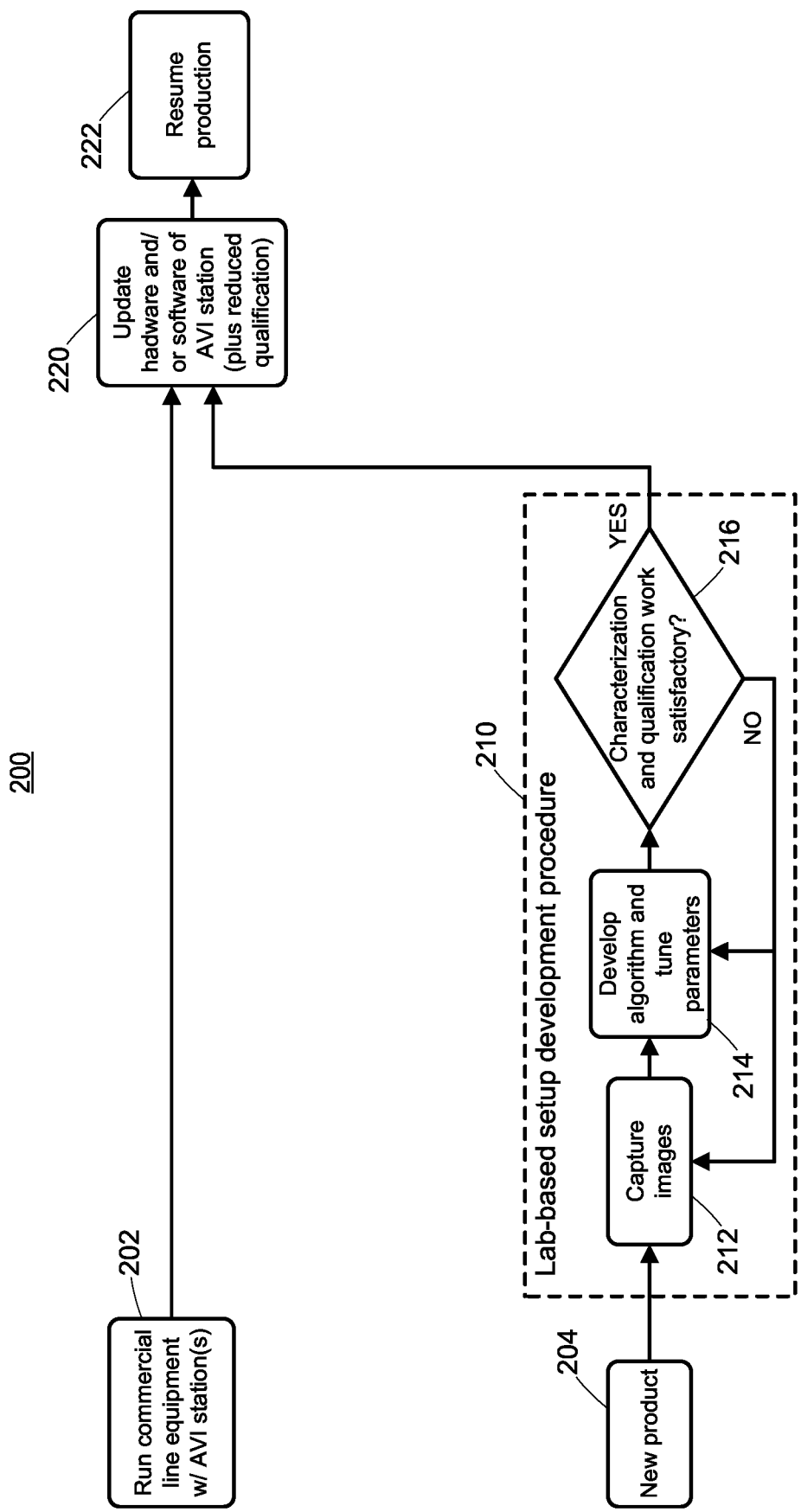
FIG. 2 depicts an example process for developing an AVI recipe and/or hardware setup for use in an AVI station of commercial line equipment by mimicking a lab-based setup.

Whereas FIGS. 1A and 1B depict a process 100 for troubleshooting an AVI station of commercial line equipment by constructing and using a mimic AVI station, FIG. 2 depicts an example process 200 in which an AVI station of commercial line equipment is upgraded to mimic the performance of a lab-based AVI setup. The commercial line equipment of FIG. 2 includes one or more AVI stations, and may be any of the types of line equipment discussed above in connection with FIGS. 1A and 1B, or below with reference to FIG. 3 (i.e., commercial line equipment 302), for example.

At stage 202, the commercial line equipment runs in a normal/production operation mode, e.g., for the fill-finish stage inspection of a particular drug product (e.g., drug-filled syringes). As discussed above in connection with FIGS. 1A and 1B, the process 200 of FIG. 2 may instead be applied to a different inspection stage (e.g., device assembly, packaging, etc.), and/or the process 200 may be used in a non-pharmaceutical context. The top horizontal line/arrow in FIG. 2, extending from stage 202 to stage 220 (discussed below), represents uninterrupted product line inspection using the commercial line equipment. The horizontal axis of FIG. 2 generally represents time, but is not necessarily to scale, and FIG. 2 does not necessarily (but may) represent the order of operations (e.g., stage 202 may begin before or after stage 204 begins).

At stage 204, a decision is made to adapt the commercial line equipment for use in fill-finish inspection for a new drug product. The new product may require custom modifications to one or more AVI stations of the commercial line equipment, for various reasons. For example, the new drug product may be less transparent than a previous product (e.g., requiring greater light intensity for imaging), or may be placed into a different type of container with different types and/or areas of potential defects, and so on.

Next, in a development procedure 210, a lab-based set up is used to develop an AVI station that is tailored to the new drug product. Within the development procedure 210, at stage 212, an imaging system (one or more cameras and any associated optical components) of the lab-based setup captures images of illuminated samples (e.g., fluid or lyophilized products) in containers (e.g., syringes or vials).

At stage 214, with the aid of the captured images, the user of the lab-based setup develops an inspection recipe/algorithm, and tune various parameters of the lab-based setup, in an effort to achieve the desired performance (e.g., less than a threshold amount of false positives and/or false negatives for particular type(s) of defects). The tuned "parameters" may include any settings, types, positions and/or other characteristics of software, imaging hardware, lighting hardware, and/or computer hardware. For example, a user may adjust light intensity settings, camera settings, camera lens types or other optic components, geometries of the imaging and illumination system, and so on. It is understood that the term "user," as used throughout this disclosure, may refer to a single person or a team of two or more people. In some scenarios, a user may develop an entirely new software algorithm at stage 214.

At stage 216, the user performs characterization and qualification work to determine whether the lab-based setup/ station, as developed/tuned at stage 214, performs satisfactorily (e.g., in accordance with applicable regulations). If not, the lab-based setup/station may be used for further development/tuning at another iteration of stage 214, which may also require capturing additional images at another iteration of stage 212. The stages 212, 214, 216 of the development procedure 210 may be repeated for any number of iterations, until the results of the characterization/qualification work at stage 216 are deemed to be satisfactory.

When the results are deemed to be satisfactory, and the new product is ready for commercial-scale production, the commercial line equipment is stopped, and the hardware and/or software of an AVI station of the line equipment is updated at stage 220 in order to mimic the performance of the lab-based setup. While not explicitly shown in FIG. 2, the mimicking process within stage 220 may involve a procedure similar to the iterative setup procedure 120 of FIG. 1A (i.e., stages 122, 124, 126), but with the initial iteration of stage 122 (potentially) not requiring any "construction" due to the fact that the AVI station being updated already exists. Indeed, in some scenarios, the first iteration of stage 122 may be skipped entirely (i.e., if developers believe the existing AVI station is already close enough to the lab-based setup to proceed straight to the image comparison tool phase), and only performed for later iterations.

Developers may also need to perform some level of in situ qualification work at stage 220 (after successful updating based on the image comparison tool), which increases the downtime of the line equipment. However, the time required for this may be far less than the qualification work during the development procedure 210, and in any case the line equipment downtime is greatly reduced by the fact that the development work (at procedure 210) occurred offline. At stage 222, after successful qualification, production on the commercial line equipment resumes, but now with the new product.

In some scenarios, both the process 100 and the process 200 are implemented, sequentially. For example, if it is determined that an AVI station of line equipment is generating an unacceptable number of false positives (i.e., flagging substantial defects where such defects do not exist), the process 100 may be used to construct and tune a mimic AVI station. Thereafter, through use of the mimic AVI station, it may be determined that different hardware components are needed (e.g., an LED ring light instead of multiple directional lights). After qualification of the new design on the mimic AVI station, the process 200 may be used when upgrading the AVI station in the line equipment, to ensure that the upgraded station precisely/sufficiently matches the performance of the mimic station.

Figure 3:
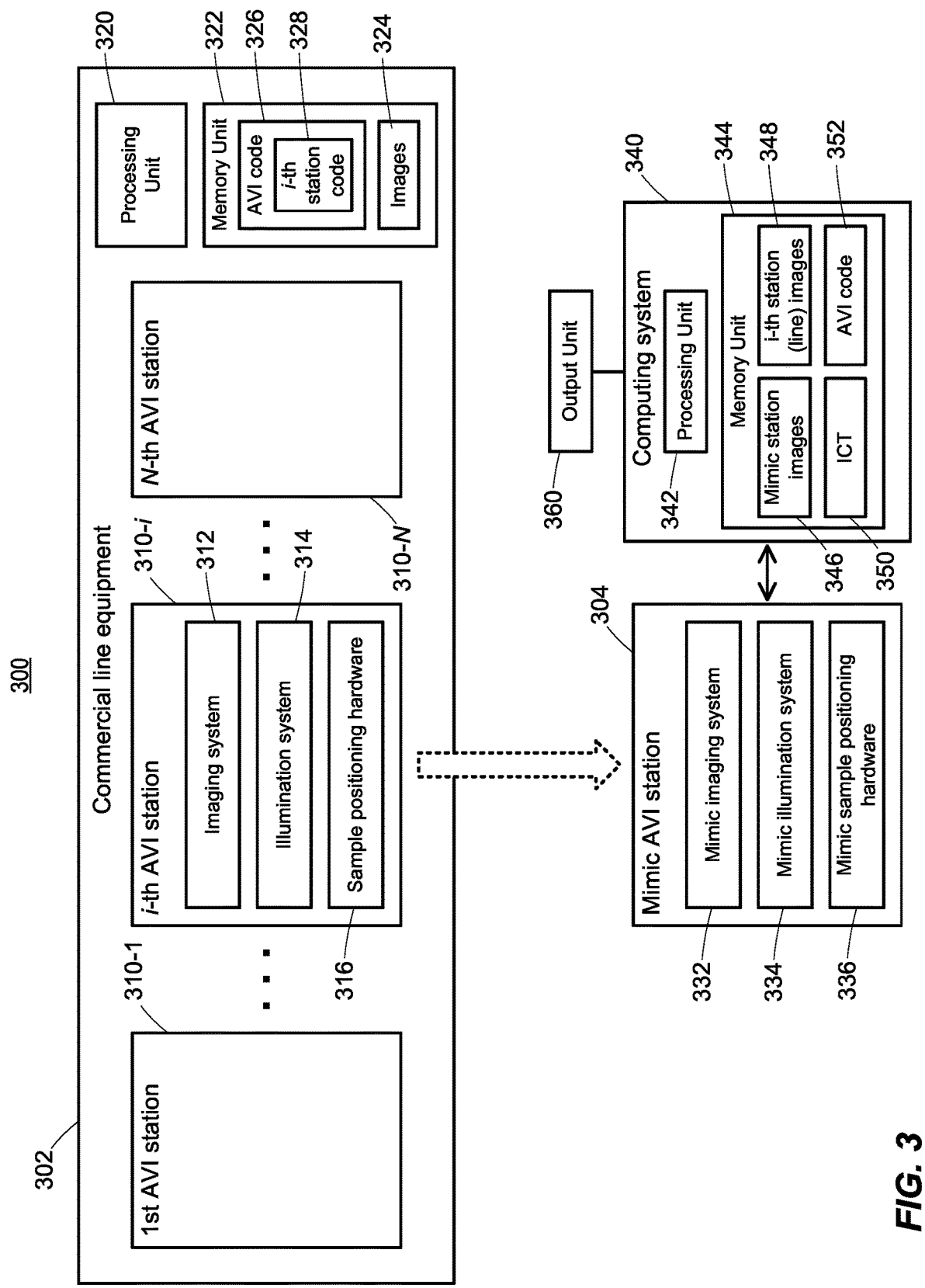
FIG. 3 is a simplified block diagram of an example system that may implement the process of FIGS. 1A and 1B.

FIG. 3 is a simplified block diagram of an example system 300 that may implement the techniques described herein. Specifically, FIG. 3 depicts an embodiment in which a mimic AVI station is used to troubleshoot an AVI station of commercial line equipment. Thus, for example, the system 300 may implement, and/or be used to implement, the process 100 of FIGS. 1A and 1B.

As seen in FIG. 3, the system 300 includes commercial line equipment 302 and a mimic AVI station 304. The line equipment 302 may be any production-grade equipment with N (N≥1) AVI stations 310-1 through 310-N (also referred to collectively as AVI stations 310). To provide just one example, the line equipment 302 may be Bosch® 296S line equipment. In the example of FIG. 3, the i-th AVI station 310-i of line equipment 302 requires troubleshooting (or, alternatively, is targeted for optimization), where i is equal to 1, N, or any number between 1 and N. Each of the AVI stations 310 may be responsible for capturing images to be used for inspection of a different aspect of the containers, and/or samples within the containers. For example, a first AVI station 310-1 may capture images of a top view of syringes or vials to inspect for cracks or chips, a second AVI station 310-2 may capture side view images to inspect the syringe or vial contents (e.g., fluid or lyophilized drug products) for foreign particles, and so on.

FIG. 3 shows, in simplified block diagram form, the general components of the i-th AVI station 310-i. In particular, the AVI station 310-i includes an imaging system 312, an illumination system 314, and sample positioning hardware 316. It is understood that the other AVI stations 310 (if any) may be similar, but potentially with different component types and configurations, as appropriate for the purpose of each given station 310.

The imaging system 312 includes one or more imaging devices and, potentially, associated optical components (e.g., additional lenses, mirrors, filters, etc.), to capture images of each sample (e.g., container plus drug product). The imaging devices may be cameras with charge-coupled device (CCD) sensors, for example. As used herein, the term "camera" or "imaging device" may refer to any suitable type of imaging device (e.g., a camera that captures the portion of the frequency spectrum visible to the human eye, or an infrared camera, etc.). The illumination system 314 includes one or more lighting devices to illuminate each sample for imaging, such as light-emitting diode (LED) arrays (e.g., a panel or ring device), for example.

The sample positioning hardware 316 may include any hardware that holds or otherwise supports the samples, and possibly hardware that conveys and/or otherwise moves the samples, for the AVI station 310-i. For example, the sample positioning hardware 316 may include a starwheel, a carousel, a robotic arm, and so on. In some embodiments, depending on the function of the AVI station 310-i, the sample positioning hardware 316 also includes hardware for agitating each sample. If the AVI station 310-i inspects for foreign particles within a liquid, for example, the sample positioning hardware 316 may include components that spin/rotate, invert, and/or shake each sample.

The line equipment 302 also includes a processing unit 320 and a memory unit 322. The processing unit 320 may include one or more processors, each of which may be a programmable microprocessor that executes software instructions stored in the memory unit 322 to execute some or all of the software-controlled functions of the line equipment 302 as described herein. Alternatively, or in addition, some of the processors in processing unit 320 may be other types of processors (e.g., application-specific integrated circuits (ASICs), field-programmable gate arrays (FPGAs), etc.), and some of the functionality of the processing unit 320 as described herein may instead be implemented in hardware. The memory unit 322 may include one or more volatile and/or non-volatile memories. Any suitable memory type or types may be included in the memory unit 322, such as read-only memory (ROM), random access memory (RAM), flash memory, a solid-state drive (SSD), a hard disk drive (HDD), and so on. Collectively, the memory unit 322 may store one or more software applications, the data received/used by those applications, and the data output/generated by those applications.

The processing unit 320 and memory unit 322 are collectively configured to control/automate the operation of the AVI stations 310, and to process images captured/generated by the AVI stations 310 to detect the respective types of defects for the containers and/or container contents (e.g., drug product). In an alternative embodiment, the functionality of processing unit 320 and/or memory unit 322 is distributed among N different processing units and/or memory units, respectively, that are each specific to a different one of the AVI stations 310-1 through 310-N. In yet another embodiment, some of the functionality of processing unit 320 and memory unit 322 (e.g., for conveyance, agitation, and/or imaging of samples) is distributed among the AVI stations 310, while other functionality of processing unit 320 and memory unit 322 (e.g., for processing sample images to detect defects) is performed by a centralized processing unit. In some embodiments, at least a portion of the processing unit 320 and/or the memory unit 322 is included in a computing system (e.g., a specifically-programmed, general-purpose computer) that is external to (and possibly remote from) the line equipment 302.

The memory unit 322 stores sample (container/product) images captured by the AVI stations 310, and also stores AVI code 326 that, when executed by processing unit 320, both (1) causes the AVI stations 310 to capture images and (2) processes the captured images to detect defects (e.g., as discussed above). For AVI station 310-i, for example, the AVI code 326 includes a respective portion denoted in FIG. 3 as code 328. As an example of one embodiment, code 328 may trigger imaging system 312 to capture images while samples are illuminated by illumination system 314, and may control sample positioning hardware 316 to place a sample in the correct position at the appropriate time, and possibly agitate the sample according to an agitation profile at the appropriate time. After the images are captured and stored as images 324, code 328 processes the images 324 to detect defects of the particular type associated with station 310-i. As noted above, in some embodiments, the portion of code 328 that processes images may be executed by a different processor, component, and/or device than the portion of code 328 that controls imaging, agitation, etc.

The mimic AVI station 304 may be a lab-based setup that was constructed in an attempt to replicate (to a sufficient degree) the performance of the particular AVI station 310-i (e.g., in response to learning that AVI station 310-i has an unacceptable level of false positives or false negatives). The mimic AVI station 304 includes a mimic imaging system 332, a mimic illumination system 334, and mimic sample positioning hardware 336. The mimic imaging system 332 includes one or more imaging devices (and possibly associated optical components) to capture images of each sample (e.g., container plus drug product), the mimic illumination system 334 includes one or more lighting devices to illuminate each sample for imaging, and the sample positioning hardware 316 includes hardware that holds or otherwise supports the samples, and possibly hardware that conveys and/or otherwise moves the samples.

Ideally, the mimic imaging system 332, mimic illumination system 334, and mimic sample positioning hardware 336 would perfectly replicate the imaging system 312, illumination system 314, and sample positioning hardware 316, respectively, of AVI station 310-$i$. More importantly, the mimic AVI station 304 as a whole would ideally replicate the performance of AVI station 310-$i$. In the real world, however, precise matching of performance is very difficult to achieve. As noted above in connection with FIG. 1A, various manual and/or automated reverse engineering techniques may be used to construct a mimic AVI station 304 (e.g., at stage 122) that initially has performance "close" to the performance of AVI station 310-$i$.

After initial construction of the mimic AVI station 104, as discussed above with reference to stage 126 of FIG. 1A, software may be used to facilitate the fine tuning of the mimic AVI station 304 for improved performance matching. To this end, the mimic AVI station 304 is coupled to a computing system 340 (e.g., a specifically-programmed general purpose computer), which includes a processing unit 342 and a memory unit 344. Computing system 340 may be separate from or integral to the mimic AVI station 304, and near or remote from the mimic AVI station 304. In some embodiments, for example, computing system (or a portion thereof) receives images from the mimic AVI station 304 via an Internet link.

The processing unit 342 may include one or more processors, each of which may be a programmable microprocessor that executes software instructions stored in the memory unit 344 to execute some or all of the software-controlled functions of the computing system 340 as described herein. Alternatively, or in addition, some of the processors in processing unit 342 may be other types of processors (e.g., ASICs, FPGAs, etc.), and some of the functionality of the processing unit 342 as described herein may instead be implemented in hardware. The memory unit 344 may include one or more volatile and/or non-volatile memories. Any suitable memory type or types may be included in the memory unit 344, such as ROM, RAM, flash memory, an SSD, an HDD, and so on. Collectively, the memory unit 344 may store one or more software applications, the data received/used by those applications, and the data output/generated by those applications.

The memory unit 344 stores images 346 captured by mimic imaging system 332, and images 348 captured by imaging system 312 of AVI station 310-$i$. The memory unit 344 also stores an image comparison tool (ICT) 350, and AVI code 352. Generally, the image comparison tool 350 facilitates the process of tuning the mimic AVI station 304 such that its performance matches the AVI station 310-$i$ (e.g., as discussed above in connection with stage 126, and below in connection with FIGS. 6 and 7), and the AVI code 352 is used to control the constructed and tuned mimic AVI station 304 during the troubleshooting or optimization process. The AVI code 352 may be a perfect (or very close) copy of the code 328, for example, and may be downloaded or uploaded from line equipment 302, from a portable memory device, from the Internet, or from another suitable source. In other embodiments, the AVI code 352 includes only a portion of code 328 (e.g., excluding a portion that is used to control conveyance of samples to and from the appropriate imaging position).

The computing system 340 is coupled to an output unit 360, which may be any type of visual and/or audio output device (e.g., a computer monitor, touchscreen or other display, and/or a speaker, of computing system 340, or a separate computing device having a display and/or speaker and coupled to computing system 340, etc.). The image comparison tool 350 and the AVI code 352 may cause the output unit 360 to provide various visual and/or audio outputs to a developer or user of the mimic AVI station 304. For example, the image comparison tool 350 may cause the output unit 360 to display various metrics representing differences between images 346 and 348 (as discussed further below), and the AVI code 352 may cause the output unit 360 to display information such as indicators of whether particular samples are defective.

While FIG. 3 depicts an embodiment in which a mimic AVI station (station 304) is used to troubleshoot an AVI station of commercial line equipment (station 310-$i$ of line equipment 302), it is understood that similar components may be used for an embodiment in which an AVI station of commercial line equipment is updated/modified to replicate the performance of a lab-based setup/station (e.g., as in the process 200 of FIG. 2). In such an embodiment, the i-th AVI station 310-$i$ is the "mimic" station, which mimics the AVI station 304 (i.e., the lab-based setup). Moreover, in such an embodiment, the image comparison tool 350 may instead reside in the memory 322 of the line equipment 302. Alternatively, the image comparison tool 350 may remain in the computing system 340.

In some embodiments, the system 300 provides access to remote sites (e.g., global manufacturing sites), to enable distant users to have direct access to lab-based setups, regardless of the respective lab and manufacturing locations. Such an approach enables real-time collaboration between sites/users across the network, and enables troubleshooting and/or development support to be located at a centralized global facility, for example, while still leveraging the expertise of diversely located individuals (engineers, etc.). Thus, a networked approach can lead to a more efficient organizational structure.

Figure 4A:
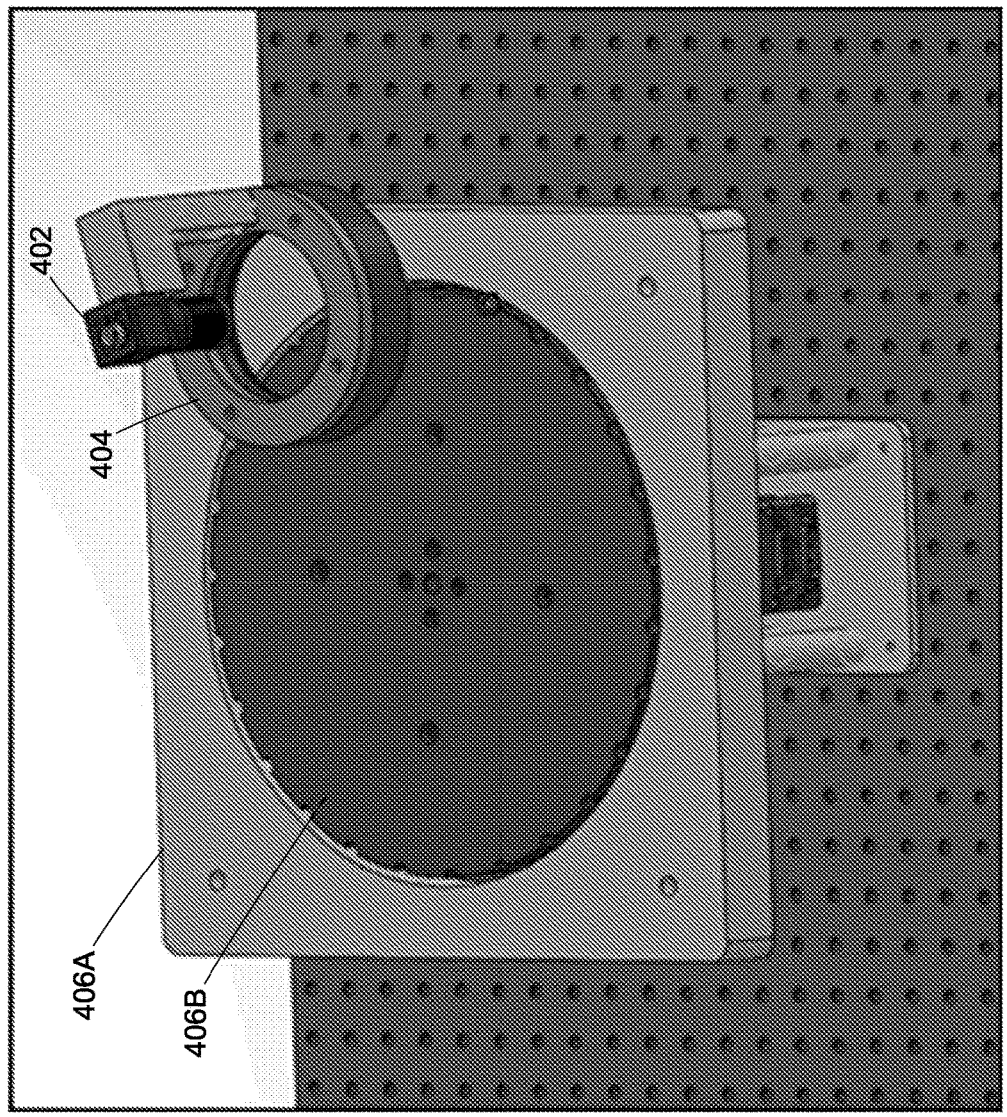
FIGS. 4A through 4D depict an example lab-based setup that may mimic an AVI station of line equipment, or be used as a development platform for an AVI station of line equipment, and associated container images.
Figure 4C:
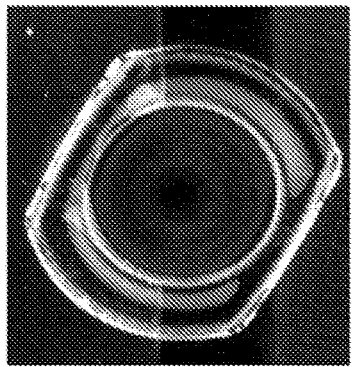
Figure 4D:
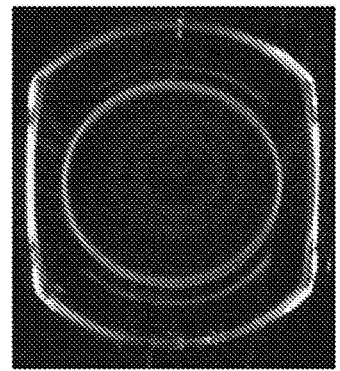
Figure 4B:
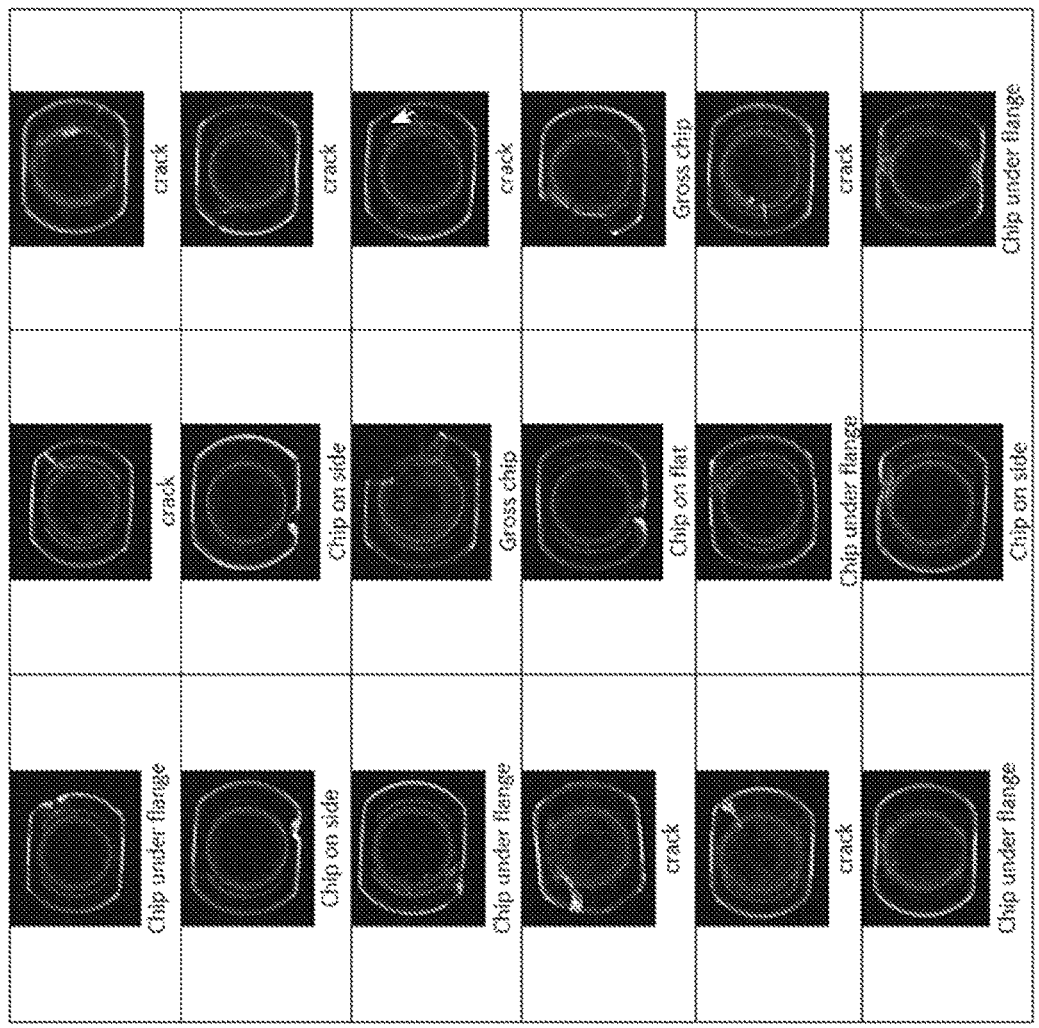
Figure 5:
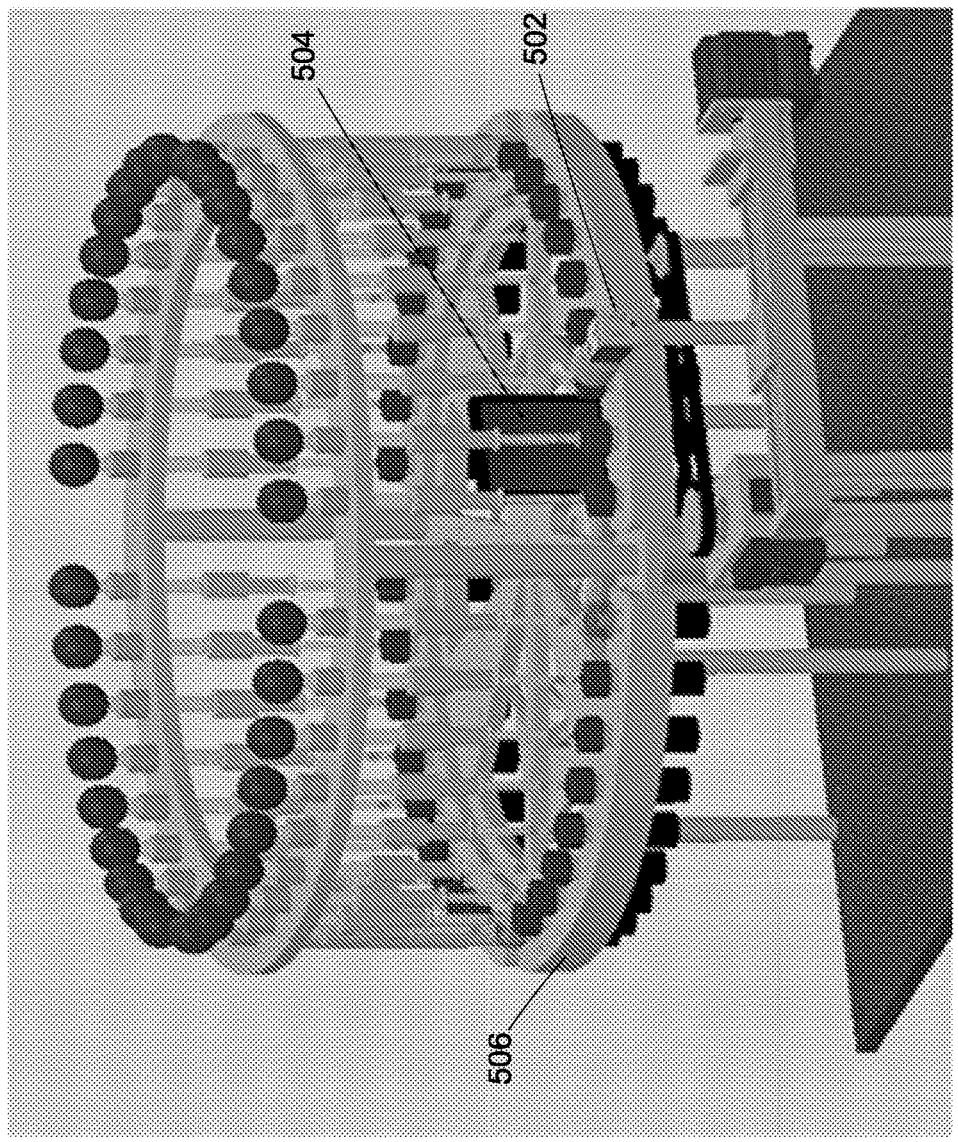
FIG. 5 depicts another example lab-based setup that may mimic an AVI station of line equipment, or be used as a development platform for an AVI station of line equipment.

FIGS. 4 and 5 depict example lab-based setups, either of which may be the mimic AVI station 304 of FIG. 3 (e.g., the mimic AVI station of the process 100) or, alternatively, a lab-based AVI station that is used as a development platform (e.g., the lab-based setup used in the process 200). It is understood that these lab-based setups/stations are merely illustrative, and that there is a virtually unlimited number of alternative types and configurations.

Referring first to FIG. 4A, a first lab-based setup 400 may be used, for example, to inspect the tops of containers (e.g., the tops of syringes filled with a liquid drug product) for defects (e.g., cracks, chips, etc.). The setup 400 includes a camera 402 for imaging the containers, and an LED ring 404 to illuminate each container while that container is being imaged. Sample positioning hardware 406 includes a platform 406A and, mounted upon the platform 406A, a starwheel 406B. The camera 402 and LED ring 404 may also be mounted (directly or indirectly) on the platform 406A. The starwheel 406B can hold containers (e.g., syringes) in fittings along the periphery of the starwheel 406B, and the starwheel 406B rotates relative to platform 406A to move each container into an imaging position (i.e., centered within the LED ring 404, and directly under the camera 402). In some embodiments and/or scenarios, however, it is only important that the setup 400 match or closely approximate the characteristics of the line equipment AVI station with respect to the imaging of a single container (e.g., lighting, optics, etc.), rather than being able to sequentially image a number of consecutive containers. Thus, in some embodiments, the starwheel 406B need not be designed to hold multiple containers or rotate, even if the AVI station being mimicked (or the AVI station for which development activities are being conducted) requires such hardware or functionality.

FIG. 4B depicts example images 450 that may be captured by the setup 400, for an embodiment in which the setup 400 (and the corresponding AVI station of the line equipment) captures top-down-view images of syringes in order to detect defects on the syringe flange. As seen in this example, the defects may include various locations and sizes of chips, as well as cracks, on the syringe flange.

FIG. 4C depicts an example image 460 representing an image captured by an AVI station of line equipment (e.g., the AVI station 310-*i* of FIG. 3), while FIG. 4D depicts an example image 470 representing an image captured by a mimic AVI station (e.g., the setup 400) after successful troubleshooting. In this example, the line equipment AVI station may have an unacceptably high rate of false positives due to the light reflections seen in the image 460, and the modifications during troubleshooting (e.g., changing to an LED ring from another type of lighting device, or changing the orientation of the camera or lighting device(s) relative to the container, etc.) result in substantially less reflections as seen in the image 470. The reduction in artifacts relating to light reflections may make it less likely that defects are obscured, and/or make it less likely that a reflection will mistakenly be interpreted as a defect.

Referring now to the example of FIG. 5, a lab-based setup 500 may be used, for instance, to inspect syringes from a side view (e.g., the sides of syringes filled with a liquid drug product) for defects (e.g., cracks, chips, stains, etc. in the sidewall of the container syringe, and/or unacceptable types and/or numbers of particles within the drug product). The setup 500 includes a camera 502 for imaging the containers, and an LED backlight 504 to illuminate each container from behind while that container is being imaged. Sample positioning hardware includes a carousel 506 that holds a number of syringes, and positions a single syringe between the camera 502 and LED backlight 504. The carousel 506 may rotate to move each syringe into an imaging position. As noted above, in some embodiments and/or scenarios, it is only important that the setup 500 match or closely approximate the characteristics of the line equipment AVI station with respect to the imaging of a given sample, rather than having the same ability to sequentially image a number of consecutive samples. Thus, in some embodiments, the carousel 506 need not be designed to hold multiple syringes or rotate, even if the AVI station being mimicked (or the AVI station for which development activities are being conducted) requires such hardware or functionality.

Figure 6:
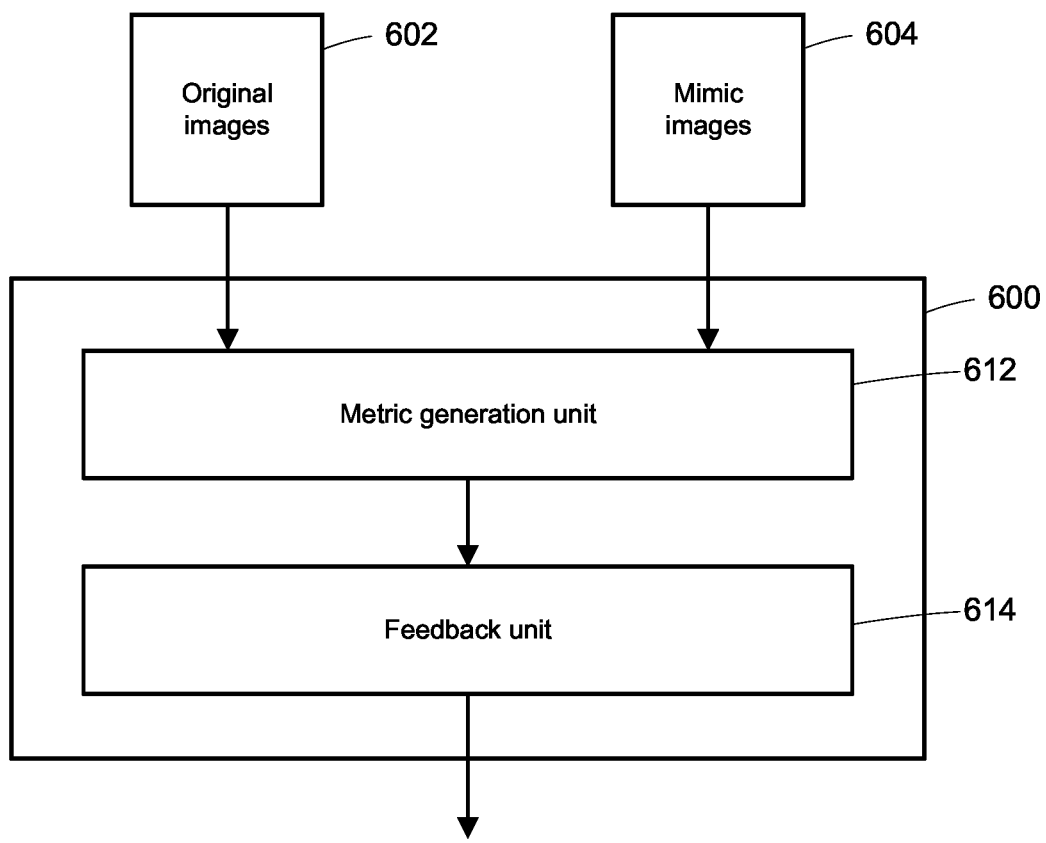
FIG. 6 depicts an example image comparison tool that may be used to facilitate construction or upgrading of a mimic AVI station.

FIG. 6 depicts an example image comparison tool 600 (e.g., image comparison tool 350 of FIG. 3) that may be used to facilitate construction and/or upgrading of a mimic AVI station (e.g., the lab-based setup in process 100 of FIG. 1, the line equipment AVI station of process 200 in FIG. 2, or the mimic AVI station 304 of FIG. 3). As seen in FIG. 6, the image comparison tool 600 receives original images 602 and mimic images 604, where the original images 602 may be the images captured by the AVI station of line equipment and the mimic images 604 may be the images captured by a lab-based setup, or vice versa, depending on whether the process 100 or the process 200 is being implemented. In some embodiments, it is assumed that the images 602, 604 use lossless image compression formats.

The image comparison tool 600 includes a metric generation unit 612 and a feedback unit 614. The metric generation unit 612 processes the images 602 and the images 604, and generates/computes metrics indicative of characteristics of the images 602, 604 and, based on those metrics, computes one or more additional metrics indicative of differences between the images 602, 604. In some embodiments, the metric generation unit 612 computes the metric(s) on an image-by-image basis, i.e., by comparing a single one of the original images 602 to a single one of the mimic images 604. In other embodiments, the metric generation unit 612 computes each of the metric(s) based on sets of multiple original images 602 and multiple mimic images 604. For example, a set of x images (x>1) of original images 602 may be averaged or superimposed upon each other, and a set of x images of mimic images 604 may be averaged or superimposed upon each other, possibly after alignment techniques are applied. Such an approach can reduce the impact of outlier images, for example. The averaging/superimposing/alignment may be performed by a same computing device or processor that implements the image comparison tool 600, for example, or by another device or processor. In an alternative embodiment (e.g., if line-scan cameras are used), x images of original images 602 are stitched together, and x images of mimic images 604 are stitched together, prior to the unit 612 computing any metrics (e.g., in embodiments where each container is rotated to get a 360 degree view of the container). Other pre-processing of the images 602 and 604 is also possible (e.g., generating an image in which each pixel has the maximum intensity for that pixel location across all of x images, etc.). For ease of explanation, the remaining description of FIG. 6, and the description of FIG. 7, refers to only one original image 602 and one mimic image 604. It is understood, however, that the above variations, or other suitable variations, are possible. Some specific examples of metrics that the metric generation unit 612 may compute are discussed below with reference to FIG. 7.

The feedback unit 614 causes, based on the difference metric(s) generated by the metric generation unit 612, one or more outputs to be presented to a user (e.g., engineer, developer, technician, etc.) in a visual and/or audio format. The outputs may be generated (e.g., displayed and/or emitted) by the output unit 360 of FIG. 3, for example. In some embodiments, the feedback unit 614 simply presents (e.g., on a graphical user interface (GUI)) the generated metric(s) to the user. For example, the feedback unit 614 may cause intensity level metrics, image defocus metrics, and/or other metrics to be displayed to the user.

In other embodiments, the feedback unit 614 instead, or additionally, generates one or more user suggestions based on one or more of the metric(s). For example, the feedback unit 614 may generate suggestions to move a camera, move a lighting device, change a light intensity, change a camera setting, and so on. Other example suggestions are discussed below with reference to FIG. 7.

In some embodiments, the metric generation unit 612 and feedback unit 614 operate substantially in real time as the mimic images 604 are captured by an imaging system of the mimic AVI station (e.g., by the mimic imaging system 332), and/or as the mimic images 604 are received by a device or system implementing the image comparison tool 600 (e.g., by the computing system 340). Thus, for example, a user may be able to capture mimic station images by selecting an interactive control on a GUI presented on output unit 360, and then almost immediately view the corresponding metrics and/or suggestions generated by metric generation unit 312 and/or feedback unit 314. In this manner, the user can quickly move through iterations of modifying the mimic AVI station (e.g., tweaking component positions, settings, etc.) and observing the effect of the modification upon the performance of the mimic AVI station (i.e., how the modification may bring the mimic AVI station closer to, or further from, the performance of the original AVI station).

Figure 7:
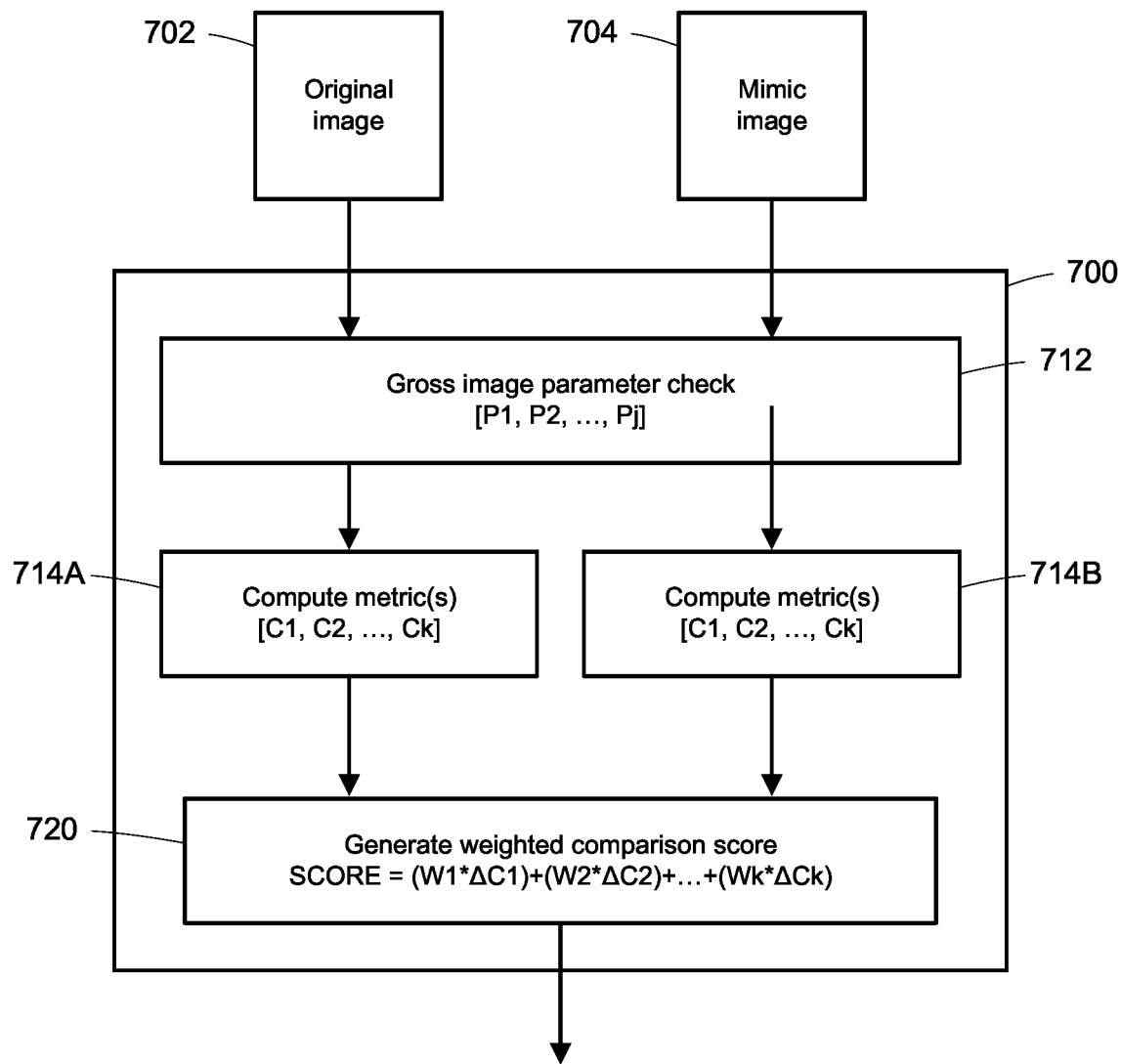
FIG. 7 depicts an example algorithm that may be implemented by the image comparison tool of FIG. 6.

FIG. 7 depicts an example algorithm 700 that may be implemented by the image comparison tool 600 (and more specifically, by the metric generation unit 612) of FIG. 6, for example. As seen in FIG. 7, the algorithm 700 accepts a single original image 702 (e.g., one of images 602) and a single mimic image 704 (e.g., one of images 704) as inputs. As noted above, these "single" images may in some embodiments be composites (e.g., averages) of multiple images. In one embodiment, the algorithm 700 is implemented in Python code, using the OpenCV library.

At stage 712, the algorithm 700 determines one or more gross image parameters (P1 through Pj, where j≥1) for the original image 702 and the mimic image 704, and compares those parameters to check for consistency. The gross image parameters may represent relatively basic image parameters, such as image size, image resolution, color depth and/or image file format, for example. The image comparison tool 600 may determine gross image parameters using configuration files that are input to, or generated by, various hardware components (e.g., cameras) of the original and mimic AVI stations, for example. The algorithm 700 may cause a GUI (e.g., displayed by the output unit 360 of FIG. 3) to indicate any difference in the gross image parameters. Thus, for example, a user may be able to easily detect when a camera (or subsequent processing) in the original AVI station alters captured images in some way (e.g., cropping, format conversion, resizing, etc.), and can manually reconfigure the mimic AVI station to reproduce those image processing operations.

At stages 714A and 714B, the algorithm 700 computes one or more metrics (C1 through Ck, where k≥1) of the original image 702 and the mimic image 704, respectively. Stages 714A and 714B may assume that the gross image parameters of the images 702, 704 are identical. The metrics may represent any image characteristics that are, or could potentially be, relevant to inspection accuracy. The algorithm 700 also includes metrics indicative of differences between corresponding metrics for the two images 702, 704 (denoted in FIG. 7 as ΔC1 through ΔCk). The algorithm may calculate some or all of the differences by simple subtraction (e.g., where ΔC1 equals the absolute value of the difference between C1 for image 702 and C1 for image 704, etc.), for example, or using other techniques (e.g., element-wise subtraction, dot product, etc.).

As one example, the metrics may include one or more light intensity metrics. Light intensity may be measured in one or more ways, depending on the embodiment. For example, for each of images 702, 704, the algorithm 700 may average the intensity values of all pixels to generate a mean value, and compare (e.g., subtract) the means values for images 702, 704. As another example, the algorithm 700 may generate a pixel intensity histogram for each of images 702, 704, and then use known techniques to mathematically compare the histograms. Some techniques that may be used, and that provide a single-valued output reflecting the difference between histograms, include the Bhattacharyya distance method, the correlation method, the chi-squared method, and the intersection method. The best technique to use may depend on the nature of the images being considered. Histogram-based intensity analyses allow the algorithm 700 to account for the dynamic range of intensities within each image (i.e., the spread between minimum and maximum intensity values).

For complex images, intensity metrics such as those discussed above may be insufficient, as uneven lighting may disproportionately reflect off of a subset of the facets of the container and its immediate environment. Moreover, coarse effects due to uneven environmental illumination (e.g., from windows or fluorescent ceiling lights) may result in large-wavelength, gentle variations in intensity across an image. In some embodiments, the algorithm 700 uses a low-pass frequency filter to capture such variations. Additionally or alternatively, the algorithm 700 may compute a fast Fourier transform (FFT) on each of images 702, 704, and process the corresponding FFT outputs to determine whether the frequency content is similarly distributed for the images 702, 704.

As another example, the metrics may include one or more metrics indicative of image defocus. For example, the algorithm 700 may compute a Laplacian of each of images 702, 704, to generate a single-valued parameter that can easily be compared. If the algorithm 700 is implemented as Python code using the OpenCV library, for instance, defocus may be computed for each of images 702, 704 as:

Defocus=cv2.Laplacian(image, cv2.CV_64F).var( )

The Laplacian metrics may also be indicative of motion of an imaged container/sample relative to the imaging camera(s). In commercial AVI systems, it is not unusual for a sample to be moving quickly relative to the inspection station. In order to achieve sharp imaging, for example, a commercial system will often employ a short camera exposure time, strobing of the illuminating lights, motion of the imaging components to track the part, or a combination of one or more of these features. If the mimic AVI station is mismatched to the original AVI station in one or more of these features, a degree of motion blur or streaking is likely to occur. The result is similar to defocus, but has a directional component. Thus, the metrics computed using the Laplacian technique may also be indicative of motion. In addition to the Laplacian, first order filters such as Sobel or Prewitt may be used to gain additional information on image sharpness.

As another example, the metrics may include one or more metrics indicative of camera noise. For modern digital industrial cameras, noise is only likely to occur at the sensor itself. Once the signal is digitized, it is generally no longer vulnerable to corruption. Because the brand and model of the camera may in some cases be easily matched when building a mimic AVI station, noise levels may be similar. As an example, cumulative noise levels on a given pixel in an 8-bit greyscale image may be within the 0-10 range, out of a 0-255 dynamic range, for a particular camera brand and model. This makes noise at room temperature negligible for most AVI applications. However, it is conceivable that in some cases, camera noise levels will impact inspection performance, and/or it may not be feasible to find and use a camera model due to obsolescence. For digital images, camera noise is usually high frequency in nature. Thus, the algorithm 700 may generate a metric indicative of camera noise by computing an FFT on each of images 702, 704, and processing the FFT output to generate a metric indicative of the level or relative level of high-frequency components.

As another example, the metrics may include one or more metrics indicative of alignment and scaling for the imaged containers (and possibly other imaged objects, such as portions of sample positioning hardware). For example, the algorithm 700 may determine relative rotation (e.g., the angle of a vertical wall of an imaged container relative to the vertical or horizontal axis of the image itself, i.e., relative to the axes established by the camera frame), and lateral and/or scale depth offsets/shifts (e.g., determined based on length and/or width as measured in pixels), of the imaged container.

At stage 716, the algorithm 700 generates a weighted comparison score for the image pair 702, 704 based on the metrics computed at stages 714A and 714B. In particular, in this example, the algorithm 700 computes the score as SCORE=(W1*ΔC1)+(W2*ΔC2)+ . . . +(Wk*ΔCk), where (as noted above) ΔCi is a difference indicator corresponding to Ci for the two images 702, 704. The weights W1, W2, . . . Wk may represent the importance of achieving similarity for each metric, specifically with respect to which metrics are more or less important to achieving equivalent AVI inspection performance. The weights may be application-specific to some degree. In some embodiments or scenarios, for example, pixel intensity levels may be more important than defocus, and therefore differences in intensity may be weighted more heavily than differences in Laplacian scalar values (or other metrics indicative of defocus).

As noted above in connection with FIG. 6, the image comparison tool 600 may cause the output unit 360 to display some or all of the computed metrics (e.g., only the difference metrics ΔC1 through ΔCk, or only the difference metrics that exceed a corresponding threshold, etc.) in real time. Alternatively, or in addition, the tool 600 may cause the output unit 360 to display the score generated at stage 716. In embodiments where a score is computed and shown, and deemed to be sufficient (e.g., above some predetermined threshold), an engineer or other user may decide that the mimic AVI station adequately matches the original AVI station, and proceed to use the mimic AVI station for troubleshooting and/or optimization.

If the score is not sufficient, or if no score is presented and the individual metrics do not appear to be sufficiently close, the user may analyze the displayed metrics in order to "tweak" the mimic AVI station as needed to achieve better matching. If the metrics show that the mimic image 704 as a whole is dim (e.g., has low average intensity) relative to the original image 702, for instance, the user might check the lighting or camera device settings (e.g., light intensity setting, lens iris aperture setting, camera gain setting, camera exposure time setting, etc.), and/or move a lighting device closer to the sample, etc.

There are several aspects associated with the illumination source that can impact the intensity of image pixels. In general, the implications are likely to be macroscopic across the image in a typical AVI application. High-end industrial LEDs are typically used for modern AVI stations. When building the mimic AVI station, intensity may drop if the LED source is not placed at the correct distance from the container. Intensity drops off as the square of the distance from the source, and so a modest difference in positioning can have a detectable impact on the final image. Once its position relative to the container is set, the LED source may still vary in brightness due to the power supply. Once all other factors have been ruled out, the image comparison tool 600 can be used in real time to fine-tune the power and subsequent brightness of the LED source. Image processing techniques such as those above provide a more precise and more nuanced solution than the conventional approach of using lux meters to measure light source brightness in AVI applications.

Some optical components, such as lenses, may include manual apertures or other components that can also impact the overall image intensity (and possibly other image characteristics, such as an aperture setting affecting image sharpness). These are often manual dials or screws on the lens, with no digital feedback. In some cases these components also lack any sort of visible gradings or rulings. Telecentric lenses are commonly used in factory-automated inspection stations to achieve high fidelity images of products. These lenses contain a pinhole aperture, which in some models can be manually adjusted in size. This has an impact on the amount of light allowed through the lens, as well as a characteristic impact on the sharpness of the image. Thus, by considering and combining the two factors, a user observing the metrics can properly set the lens characteristics associated with intensity.

A substantial, even drop in intensity across an image can also be indicative of incorrect filter placement, either across the illuminating source (such as a polarizer or diffuser) or in front of the camera (such as an alternate polarizer or wavelength filter). Thus, the user might try adjusting filter placement when observing a substantial difference in image intensities.

As another example, a user examining intensity histograms for the images 702, 704, and/or the outputs of low-pass frequency filtering, may determine whether there are significant localized differences in intensities between the images 702, 704. If localized differences do exist, the user can attempt to identify and remove the source of those localized differences by studying the images 702, 704 along with the histograms and/or other metrics.

As another example, if the metrics show that the container in the mimic image 704 is misaligned and/or improperly scaled relative to the container in the original image 702, the user might adjust the alignment (e.g., angle or rotation) of the container and/or camera, the distance between container and camera, the zoom level (e.g., lens type or digital zoom setting) of the camera, and so on.

As another example, if the metrics (e.g., a difference in scalar Laplacian outputs) show defocus of one of images 702, 704 relative to the other, the user might adjust a distance between the container and camera, a motor speed, a camera exposure time, and so on. Telecentric lenses of the sort often used in inspection applications typically have an unforgivingly short depth of field, such that a small error in relative placement of the lens and the container can result in a blurry image. Thus, even small differences in distances may have a large impact on defocus. Moreover, as discussed above, some of these lenses have a variable pinhole aperture, which can also contribute to a blurry image if improperly set. Thus, the user may also adjust the aperture if the metrics indicate a difference in defocus.

Other metrics may lead the user to adjust these and/or other aspects of the mimic AVI station, e.g. to achieve better matching of stray reflections in the images, the presence of critical objects in the images, image dynamic range, image bleaching, image contrast, and so on.

In some embodiments, as noted above, the image comparison tool 600 generates one or more suggestions based on the metrics. Thus, for example, the image comparison tool 600 may cause the output unit 360 to display (and/or generate a computer voice message describing) any of the remedial techniques discussed above (e.g., increasing or decreasing distance between camera and container, and possibly increasing or decreasing lens aperture, etc., if metrics reflecting a difference in intensity and/or defocus of the images 702, 704 are above threshold levels, etc.).

Figure 8:
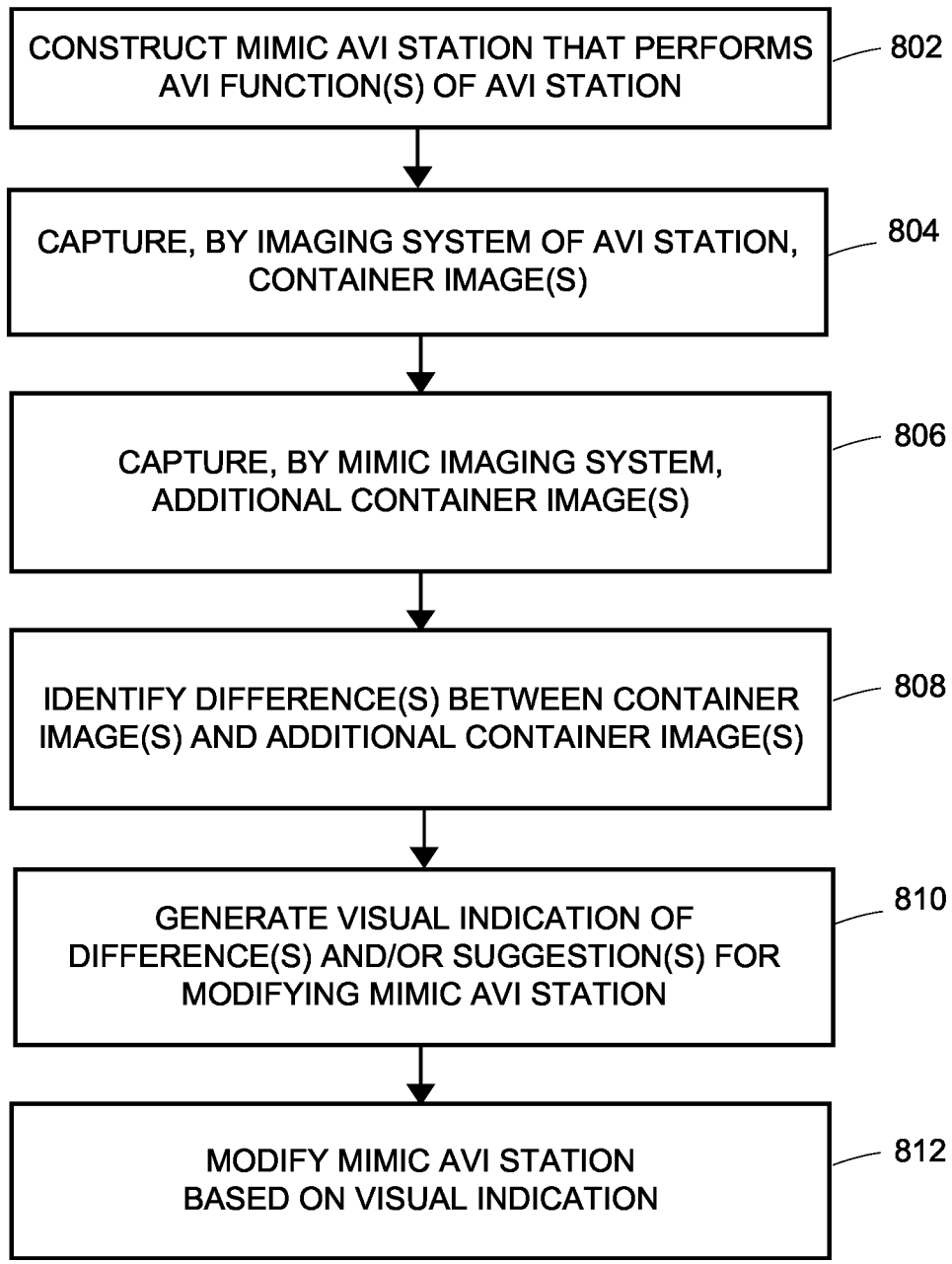
FIG. 8 is a flow diagram of an example method for replicating performance of a lab-based or line equipment AVI station.

FIG. 8 is a flow diagram of an example method 800 for replicating performance of an AVI station (e.g., the AVI station 310-*i* in a troubleshooting scenario, or a lab-based setup used for development, etc.). In the method 800, at block 802, a mimic AVI station (e.g., the mimic AVI station 304 in a troubleshooting scenario, or the AVI station 310-*i*, etc.) that performs one or more AVI functions of the original AVI station is constructed. Block 802 may be performed manually by reverse engineering the original AVI station. In some embodiments, however, block 802 includes using software to assist in the reverse engineering process (e.g., by interpreting CAD files or the output of a 3D scanner). Block 802 may include a first iteration of the stage 122, for example.

At block 804, one or more container images (i.e., images of a container at the appropriate imaging position within the original AVI station) are captured by an imaging system (e.g., a single camera) of the original AVI station. At block 806, one or more additional container images are captured by an imaging system (e.g., a single camera of the same type) of the mimic AVI station. Blocks 804 and 806 may be similar to stages 112 and 124, respectively, of the process 100, for example.

Thereafter, at block 808, one or more differences between the container image(s) captured by the original AVI station and the container image(s) captured by the mimic AVI station are identified. Block 808 may be performed by a processing unit (e.g., processing unit 342) executing an image comparison tool (e.g., tool 350). For example, the image comparison tool may generate one or more metrics reflecting the differences at block 808. Block 808 may include the stages 714A and 714B of the algorithm 700, and the subsequent generation of difference metrics (e.g., the metrics $\Delta C1$ through $\Delta Ck$ in FIG. 7), for example.

At block 810, a visual indication of the difference(s) identified at block 808 is generated, in order to assist a user in modifying the mimic AVI station. The visual indication may include one or more of metrics (e.g., difference metrics) computed at block 808, for example, and/or one or more suggestions based on those metrics (e.g., as discussed above in connection with FIGS. 6 and 7). Block 810 may be performed by the same processing unit that performs block 808, and may include causing an output unit (e.g., output unit 360) to present the visual indication (i.e., metric(s) and/or suggestions), for example.

At block 812, the mimic AVI station is modified based on the visual indication generated at block 810. Block 812 may be performed entirely by the user (i.e., manually), or may be performed at least in part automatically (e.g., by computing system 340 adjusting digital settings of a camera or lighting device of the mimic AVI station, etc.). Block 812 may include a second (or later) iteration of the stage 122 of the process 100, for example.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for replicating performance of an automated visual inspection (AVI) station, the method comprising:
   constructing a mimic AVI station that performs one or more AVI functions of the AVI station, wherein the mimic AVI station includes a mimic illumination system, a mimic imaging system, and mimic sample positioning hardware configured to hold and/or support containers containing samples;
   capturing, by an imaging system of the AVI station while a container is illuminated by an illumination system of the AVI station, one or more container images;
   capturing, by the mimic imaging system while a container is illuminated by the mimic illumination system, one or more additional container images;
   identifying, by one or more processors, one or more differences between the one or more additional container images and the one or more container images;
   generating, by the one or more processors, a visual indication of (i) the one or more differences, and/or (ii) one or more suggestions for modifying the mimic AVI station; and
   modifying the mimic AVI station based on the visual indication, at least by modifying the mimic illumination system, the mimic imaging system, and/or the mimic sample positioning hardware.

2. The method of claim 1, wherein either (i) the AVI station is included in commercial line equipment and the mimic AVI station is a lab-based setup, or (ii) the mimic AVI station is included in the commercial line equipment and the AVI station is the lab-based setup.

3. The method of claim 1, wherein modifying the mimic station includes:
   modifying a spatial arrangement of at least one lighting device of the mimic illumination system, at least one imaging device of the mimic imaging system, and/or the mimic sample positioning hardware; and/or
   modifying hardware components of at least one lighting device of the mimic illumination system, at least one imaging device of the mimic imaging system, and/or the mimic sample positioning hardware.

4. The method of claim 1, further comprising:
   installing, on a computer system of the mimic AVI station, AVI software that implements an inspection algorithm that is also implemented by the AVI equipment; and
   after modifying the mimic AVI station,
      capturing, by the mimic imaging system, one or more new container images while a test container is illuminated by the mimic illumination system, and
      determining one or more characteristics of the test container, and/or a sample within the test container, by processing the one or more new container images according to the inspection algorithm.

5. The method of claim 4, further comprising:
   troubleshooting or optimizing the mimic AVI station based at least in part on the determined one or more characteristics, wherein troubleshooting or optimizing the mimic AVI station includes modifying or further modifying the mimic illumination system, the mimic imaging system, the mimic sample positioning hardware, and/or the AVI software.

6. The method of claim 5, further comprising:
modifying the AVI station in accordance with the modifications or further modifications to the mimic illumination system, the mimic imaging system, the mimic sample positioning hardware, and/or the AVI software.

7. The method of claim 1, wherein:
the one or more container images includes a first plurality of container images;
the one or more additional container images includes a second plurality of container images; and
identifying the one or more differences between the one or more additional container images and the one or more container images includes identifying one or more differences between a first composite image derived from the first plurality of container images and a second composite image derived from the second plurality of container images.

8. The method of claim 1, wherein identifying the one or more differences between the one or more additional container images and the one or more container images includes identifying differences with respect to:
container alignment;
defocus;
intensity;
variation in intensity;
motion blurring; and/or
imaging sensor noise.

9. The method of claim 1, wherein identifying the one or more differences between the one or more additional container images and the one or more container images includes computing (i) a fast Fourier transforms (FFT) of the one or more container images or a composite image derived therefrom, and (ii) an FFT of the one or more additional container images or a composite image derived therefrom.

10. The method of claim 1, wherein identifying the one or more differences between the one or more additional container images and the one or more container images includes generating (i) a histogram of pixel intensity levels for the one or more container images or a composite image derived therefrom, and (ii) a histogram of pixel intensity levels for the one or more additional container images or a composite image derived therefrom.

11. The method of claim 1, wherein identifying the one or more differences between the one or more additional container images and the one or more container images includes computing (i) a Laplacian of the one or more container images or a composite image derived therefrom, and (ii) a Laplacian of the one or more additional container images or a composite image derived therefrom.

12. The method of claim 1, wherein (i) identifying the one or more differences, and (ii) generating the visual indication, are performed in real time as the one or more additional container images are captured.

13. The method of claim 1, further comprising:
generating, by the one or more processors, the one or more suggestions for modifying the mimic AVI station based on the one or more differences,
wherein generating the visual indication includes generating the visual indication of the one or more suggestions.

14. The method of claim 13, wherein generating the one or more suggestions includes generating:
a suggestion to modify one or more configurable settings of at least one imaging device of the mimic imaging system;
a suggestion to modify one or more configurable settings of at least one lighting device of the mimic illumination system;
a suggestion to modify a position of at least one imaging device of the mimic imaging system; and/or
a suggestion to modify a position of at least one lighting device of the mimic illumination system.

15. The method of claim 13, wherein:
the mimic sample positioning hardware is configured to move containers according to a movement profile; and
generating the one or more suggestions includes generating a suggestion to modify one or more characteristics of the movement profile.

16. The method of claim 1, further comprising:
receiving, by the one or more processors, one or more operational parameters of the imaging system and one or more operational parameters of the mimic imaging system;
comparing, by the one or more processors, the one or more operational parameters of the imaging system to the one or more operational parameters of the mimic imaging system; and
generating, by the one or more processors, an additional visual indication of at least one operational parameter that differs between the imaging system and the mimic imaging system.

17. A non-transitory, computer-readable medium storing instructions that, when executed by one or more processors, cause the one or more processors to:
receive one or more container images captured by an imaging system of an automated visual inspection (AVI) station;
receive one or more additional container images captured by a mimic imaging system of a mimic AVI station;
identify one or more differences between the one or more additional container images and the one or more container images;
generate a visual indication of (i) the one or more differences, and/or (ii) one or more suggestions for modifying the mimic AVI station; and
modify the mimic AVI station based on the visual indication, at least by modifying a mimic illumination system, the mimic imaging system, and/or mimic sample positioning hardware of the mimic AVI station.

18. The non-transitory, computer-readable medium of claim 17, wherein the instructions cause the one or more processors to identify one or more differences between the one or more additional container images and the one or more container images with respect to:
container alignment;
defocus;
intensity;
variation in intensity;
motion blurring; and/or
imaging sensor noise.

19. The non-transitory, computer-readable medium of claim 17, wherein the instructions cause the one or more processors to identify the one or more differences between the one or more additional container images and the one or more container images at least by:
computing a fast Fourier transforms (FFT) of the one or more container images or a composite image derived therefrom; and
computing an FFT of the one or more additional container images or a composite image derived therefrom.

20. The non-transitory, computer-readable medium of claim 17, wherein the instructions cause the one or more processors to identify the one or more differences between the one or more additional container images and the one or more container images at least by:

generating a histogram of pixel intensity levels for the one or more container images or a composite image derived therefrom; and generating a histogram of pixel intensity levels for the one or more additional container images or a composite image derived therefrom.

21. The non-transitory, computer-readable medium of claim 17, wherein the instructions cause the one or more processors to identify the one or more differences between the one or more additional container images and the one or more container images at least by:

computing a Laplacian of the one or more container images or a composite image derived therefrom; and computing a Laplacian of the one or more additional container images or a composite image derived therefrom.

22. The non-transitory, computer-readable medium of claim 17, wherein the instructions cause the one or more processors to (i) identify the one or more differences, and (ii) generate the visual indication, in real time as the one or more additional container images are received.

23. The non-transitory, computer-readable medium of claim 17, wherein:

the instructions cause the one or more processors to generate the one or more suggestions for modifying the mimic AVI station based on the one or more differences; and the visual indication indicates the one or more suggestions.

24. The non-transitory, computer-readable medium of claim 23, wherein the one or more suggestions include:

a suggestion to modify one or more configurable settings of at least one imaging device of the mimic imaging system;

a suggestion to modify one or more configurable settings of at least one lighting device of a mimic illumination system of the mimic AVI station;

a suggestion to modify a position of at least one imaging device of the mimic imaging system; and/or a suggestion to modify a position of at least one lighting device of the mimic illumination system.

25. A system comprising:

an automated visual inspection (AVI) station comprising
an imaging system,
an illumination system, and
sample positioning hardware configured to hold and/or support containers containing samples;

a mimic AVI station that performs one or more AVI functions of the AVI station, the mimic AVI station comprising
a mimic illumination system,
a mimic imaging system, and
mimic sample positioning hardware configured to hold and/or support containers containing samples; and a computing system configured to
receive one or more container images captured by the imaging system of the AVI station;
receive one or more additional container images captured by the mimic imaging system of the mimic AVI station;
identify one or more differences between the one or more additional container images and the one or more container images;
generate a visual indication of (i) the one or more differences, and/or (ii) one or more suggestions for modifying the mimic AVI station; and
modify the mimic AVI station based on the visual indication, at least by modifying the mimic illumination system, the mimic imaging system, and/or the mimic sample positioning hardware of the mimic AVI station.

* * * * *